United States Patent
Shimizu et al.

(10) Patent No.: US 10,369,530 B2
(45) Date of Patent: Aug. 6, 2019

(54) HOLLOW FIBER SEMIPERMEABLE MEMBRANE, METHOD FOR MANUFACTURING SAME, MODULE, AND WATER TREATMENT METHOD

(71) Applicant: TOYOBO CO., LTD., Osaka-shi, Osaka (JP)

(72) Inventors: Michiko Shimizu, Otsu (JP); Toshiyuki Yagi, Otsu (JP); Shinobu Tokimi, Otsu (JP)

(73) Assignee: TOYOBO CO., LTD., Kita-ku (JP)

( * ) Notice: Subject to any disclaimer, the term of this patent is extended or adjusted under 35 U.S.C. 154(b) by 0 days.

(21) Appl. No.: 14/362,187

(22) PCT Filed: Feb. 8, 2013

(86) PCT No.: PCT/JP2013/053014
§ 371 (c)(1),
(2) Date: Jun. 2, 2014

(87) PCT Pub. No.: WO2013/118859
PCT Pub. Date: Aug. 15, 2013

(65) Prior Publication Data
US 2015/0265976 A1   Sep. 24, 2015

(30) Foreign Application Priority Data
Feb. 9, 2012 (JP) .................................. 2012-025902

(51) Int. Cl.
*B01D 71/16* (2006.01)
*B01D 69/08* (2006.01)
(Continued)

(52) U.S. Cl.
CPC ........... *B01D 71/16* (2013.01); *B01D 61/002* (2013.01); *B01D 63/021* (2013.01);
(Continued)

(58) Field of Classification Search
None
See application file for complete search history.

(56) References Cited

U.S. PATENT DOCUMENTS

| 4,239,545 A | 12/1980 | Uemura et al. |
| 4,371,487 A | 2/1983 | Hamada et al. |
| (Continued) | | |

FOREIGN PATENT DOCUMENTS

| EP | 2 586 518 A1 | 5/2013 |
| JP | 55-152501 A | 11/1980 |
| (Continued) | | |

OTHER PUBLICATIONS

Extended European Search Report dated Jul. 29, 2015, issued in counterpart European Patent Application No. 13746612.4 (7 pages).
(Continued)

*Primary Examiner* — Ryan B Huang
(74) *Attorney, Agent, or Firm* — Westerman, Hattori, Daniels & Adrian, LLP

(57) ABSTRACT

To provide a hollow fiber type semipermeable membrane which achieves both water permeability and salt rejection ability at high level, so as to conduct, with small membrane area, a water treatment utilizing concentration difference from liquid mixture of high concentration and high osmotic pressure.
A hollow fiber type semipermeable membrane comprising cellulose acetate, characterized in that, between an aqueous solution of 25° C. having sodium chloride concentration of 35,000 mg/L and freshwater of 25° C. having sodium chloride concentration of 0 g/L at 0 MPa, the permeation flow rate flown from inner side to the outer side of the hollow fiber type semipermeable membrane is 60 to 180 L/m²/day, the outer diameter of the hollow fiber type semi-
(Continued)

permeable membrane is 100 to 350 μm, the inner diameter thereof is 50 to 250 μm and the hollow ratio thereof is 24 to 51%.

4 Claims, 1 Drawing Sheet

(51) Int. Cl.
| | |
|---|---|
| *B01D 61/00* | (2006.01) |
| *B01D 67/00* | (2006.01) |
| *C02F 1/44* | (2006.01) |
| *B01D 63/02* | (2006.01) |
| *B01D 69/02* | (2006.01) |
| *C02F 101/12* | (2006.01) |
| *C02F 103/08* | (2006.01) |

(52) U.S. Cl.
CPC ....... *B01D 63/028* (2013.01); *B01D 67/0083* (2013.01); *B01D 67/0088* (2013.01); *B01D 69/02* (2013.01); *B01D 69/08* (2013.01); *B01D 69/087* (2013.01); *C02F 1/445* (2013.01); *B01D 2311/14* (2013.01); *B01D 2323/00* (2013.01); *B01D 2325/04* (2013.01); *B01D 2325/20* (2013.01); *C02F 2101/12* (2013.01); *C02F 2103/08* (2013.01); *C02F 2209/40* (2013.01)

(56) References Cited

U.S. PATENT DOCUMENTS

| | | | |
|---|---|---|---|
| 4,780,205 A | 10/1988 | Murakami et al. | |
| 4,781,834 A | 11/1988 | Sekino et al. | |
| 4,980,063 A | 12/1990 | Mahoney et al. | |
| 5,011,637 A | 4/1991 | Overman, III et al. | |
| 5,131,928 A * | 7/1992 | Blackman | B01D 53/22 210/500.41 |
| 2006/0016754 A1* | 1/2006 | Ito | A01N 59/02 210/652 |
| 2006/0226067 A1 | 10/2006 | Herron | |
| 2010/0108599 A1 | 5/2010 | Vizvardi et al. | |
| 2010/0219122 A1 | 9/2010 | Ogawa et al. | |
| 2011/0062074 A1* | 3/2011 | Ishibashi | B01D 61/18 210/321.87 |
| 2011/0316181 A1* | 12/2011 | Liu | B01D 53/228 264/45.5 |
| 2012/0043274 A1 | 2/2012 | Chi et al. | |
| 2012/0074064 A1* | 3/2012 | Krause | B01D 69/088 210/646 |

FOREIGN PATENT DOCUMENTS

| | | |
|---|---|---|
| JP | 59-036715 A | 2/1984 |
| JP | 59-042008 A | 3/1984 |
| JP | 09-019630 A | 1/1997 |
| JP | 10-337448 A | 12/1998 |
| JP | 2000-334275 A | 12/2000 |
| JP | 2003-290632 A | 10/2003 |
| JP | 2004-82020 A | 3/2004 |
| JP | 2008-132441 A | 6/2008 |
| JP | 2011-212638 A | 10/2011 |
| WO | 2009/051168 A1 | 4/2009 |
| WO | 2010/144057 A1 | 12/2010 |
| WO | 2011/028541 A2 | 3/2011 |
| WO | 2011/136465 A2 | 11/2011 |
| WO | 2011/155338 A1 | 12/2011 |
| WO | 2012/002263 A1 | 1/2012 |
| WO | 2012/026373 A1 | 3/2012 |

OTHER PUBLICATIONS

International Search Report, dated Apr. 16, 2013, issued in corresponding application No. PCT/JP2013/053014.
International Search Report dated Nov. 1, 2011, issued in application No. PCT/JP2011/068612. (2 pages).
Notification of Transmittal of Translation of the International Preliminary Report on Patentabililty (Form PCT/IB/338) of International Application No. PCT/JP2011/068612 dated Mar. 28, 2013 with Forms PCT/IB/373 and PCT/ISA/237. (5 pages).
Non-Final Office Action dated Jun. 19, 2014, issued in U.S. Appl. No. 13/805,227, (16 pages).
Notice of Allowance dated Oct. 29, 2014, issued in U.S. Appl. No. 13/805,227, (7 pages).
International Search Report dated May 14, 2013, issued in application No. PCT/JP2013/054515. (2 pages).
Hagiwara, Bunji, et al., "Separation methods using membranes", Kodansha Ltd., Japan, Aug. 1, 2014, 8th Print, pp. 35-39, w/English summary.
Extended European Search Report dated Jul. 29, 2015, issued in European Patent Application No. 13751153.1 (9 pages).
Non-Final Office Action dated May 23, 2016, issued in U.S. Appl. No. 14/371,704 (25 pages).
Office Action dated Jan. 17, 2017, issued in counterpart Japanese Patent Application No. 2014-500949, with English translation. (13 pages).
Hagiwara, Bunji, et. al., "separation methods using membranes", Koudansha Ltd., Japan, Aug. 1, 1989, 8th Print, p. 34-39, cited in Japanese Office Action dated Jan. 10, 2017, w/English summary.
Non-Final Office Action dated Apr. 17, 2017, issued in U.S. Appl. No. 14/371,704 . (15 pages).
Final Office Action dated Sep. 29, 2017, issued in U.S. Appl. No. 14/371,704. (15 pages).
Final Office Action dated Nov. 2, 2016, issued in U.S. Appl. No. 14/371,704 (14 pages).
Non-Final Office Action dated Sep. 28, 2018, issued in U.S. Appl. No. 14/371,704. (12 pages).

* cited by examiner

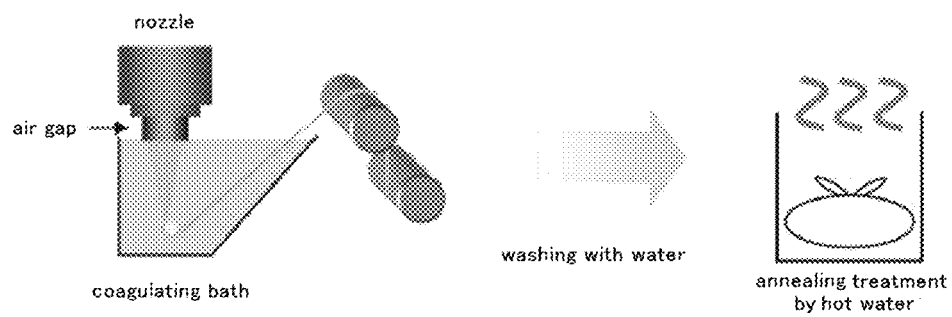

HOLLOW FIBER SEMIPERMEABLE MEMBRANE, METHOD FOR MANUFACTURING SAME, MODULE, AND WATER TREATMENT METHOD

TECHNICAL FIELD OF THE INVENTION

The present invention relates to a hollow fiber type semipermeable membrane which can maintain both water permeability and separating property in high level, reduce a space for installment and enhance the treating efficiency. It also relates to a method for manufacturing the same, to a module and to a water treatment method. More specifically, it relates to the concentration/recovery of valuables, or to the reduction in volume by means of concentration of waste water, or to the production of energy wherein freshwater is permeated from aqueous solution of low concentration to aqueous solution of high concentration in pressurized state utilizing the difference in the concentrations as driving force and a turbine, etc. is rotated by the pressure and the flow rate of the aqueous solution of the high-concentration which are increased by the permeated freshwater. It is particularly used for water treatment wherein freshwater is taken out from feed aqueous solution such as seawater utilizing the concentration difference between the feed aqueous solution and aqueous solution of higher concentration.

BACKGROUND ART

Separation/concentration of liquid mixtures by a membrane separation method is an energy-saving method as compared with a separation technique such as distillation because it is not accompanied with phase change. Also, it does not cause the phase changes in the state of substances. Therefore, it has been widely utilized in many fields including a food field such as concentration of fruit juice and separation of beer enzyme; and recovery of organic substances from industrial wastewater. Treatment of water by a semipermeable membrane has become firmly established as an indispensable process supporting the most leading-edge technology.

For example, recovery of freshwater from seawater with semipermeable membrane utilizing the concentration difference between seawater and aqueous solution of high concentration has been expected as an energy-saving desalination process for seawater since consumption of energy thereby is small as compared with a conventional method wherein higher pressure than osmotic pressure is applied to seawater followed by permeating with a reverse osmosis membrane so as to recover freshwater from seawater. Particularly due to the fact that a hollow fiber type semipermeable membrane can make the membrane area per membrane module volume large in spite of its small flow rate of permeated water per unit membrane area as compared with a spiral wound type semipermeable membrane, it has advantages that the permeated water flow rate can be made large as a whole and that volume efficiency is very high whereby it has excellent compactness. Further, in such a case of water treatment wherein aqueous solution of high concentration is fed into a module and made to contact with an aqueous solution of low concentration via a hollow fiber type semipermeable membrane and concentration difference generated thereby is used as a driving force, there are advantages that concentration polarization on the membrane surface can be made small as compared with reverse osmosis and that lowering of the concentration difference can be suppressed.

Generally, the conventional hollow fiber type semipermeable membrane for reverse osmosis treatment is manufactured in such a method that a dope containing cellulose acetate is prepared as a polymer material, extruded from a nozzle into air, coagulated in aqueous solution, washed with water and shrunk by annealing by hot water. For example, Examples in the Patent Document 1 disclose a hollow fiber type semipermeable membrane prepared in such a manner that a dope containing cellulose triacetate as a polymer material is extruded, coagulated, washed with water and annealed by hot water of 85° C. for 20 minutes under no tension. According to the data of the Examples, it is shown that, when 0.2% aqueous solution of sodium chloride was used as a feed water and measurement was conducted under the pressure of 30 kg/cm$^2$, the permeation flow rate and NaCl rejection rate of hollow fiber type semipermeable membrane were 230 L/m$^2$/day and 99.85% (Example 1); 245 L/m$^2$/day and 99.87% (Example 3); or 250 L/m$^2$/day and 99.84% (Example 4), respectively. However, in the conventional hollow fiber type semipermeable membrane as disclosed in the Patent Document 1, a high salt rejection property can achieved because the membrane shrinkage is made big by means of an annealing treatment by hot water at high temperature. When it is used at low pressure, however, there is a problem that the water permeation property greatly lowers. Accordingly, its treating ability cannot be made high when, for example, high pressure is not applied including such a case wherein the semipermeable membrane is used for water treatment utilizing the concentration difference as a driving force.

Examples of an art for keeping both water permeability and separating property in high level in a hollow fiber type semipermeable membrane include Patent Documents 2 and 3. The Patent Document 2 discloses an art concerning a hollow fiber type semipermeable membrane module which is utilized for the separation of solid or solute from a liquid mixture. However, according to the properties of the hollow fiber membrane using cellulose triacetate shown in Table 1 of the Patent Document 2, the permeation flow rate (FR1) measured under operation pressure of 55 kg/cm$^2$ is 22.6 to 91.5 L/m$^2$·day and no high water permeability can be achieved in forward osmosis treatment.

Patent Document 3 discloses an art concerning a flat sheet type composite semipermeable membrane which is equipped, on a microporous support, with an active layer (thin membrane, skin layer) containing interfacial polymerized polyamide as a main component and which has both high salt rejection rate and high permeability. According to the description of Example 1, the semipermeable membrane disclosed in the Patent Document 3 has permeation flow rate of 1.0 m$^3$/m$^2$·day (1000 L/m$^2$·day) when measured under an operation pressure of 7.5 kg/m$^2$. However, this semipermeable membrane is in a form of flat membrane whereby, in a membrane module used for the actual water treatment wherein the concentration difference via semipermeable membrane is used as a driving force, it is difficult that aqueous solution of high concentration and aqueous solution of low concentration (freshwater) fed to the module are effectively and uniformly partitioned to the front surface of the membrane. In addition, in the area to which small flow rate of the aqueous solution is fed, concentration polarization on the membrane surface becomes particularly high. Accordingly, it is difficult to effectively ensure the concentration difference via the membrane whereby there is a disadvantage that efficiency of the water treatment cannot be made high. Moreover, in the membrane comprising such a polyamide material, there are disadvantages that it is inferior in its resistance to chlorine and that usable bactericidal chemicals are limited.

On the other hand, there has been a brisk demand from the consumers paying their importance to economy and compactness of a water treatment plant using a membrane method for improving the treating ability per membrane area even in the case of a hollow fiber type semipermeable membrane. In the case of water treatment wherein the concentration difference is used as a driving force, no high water permeability is achieved even if the conventional semipermeable membrane for lower pressure is used. As a result, it is the present situation that water production cost and installation space cannot be suppressed.

As mentioned hereinabove, it is the present situation that there is no cellulose acetate-based hollow fiber type semipermeable membrane which can achieve both water permeability and selectivity in high level and which can perform efficient water treatment utilizing the concentration difference between two liquids via a membrane, in a small installation space.

PRIOR ART DOCUMENTS

Patent Documents

Patent Document 1: Japanese Patent Application Laid-Open (JP-A) No. 36715/84
Patent Document 2: Japanese Patent Application Laid-Open (JP-A) No. 337448/98
Patent Document 3: Japanese Patent Application Laid-Open (JP-A) No. 19630/97

DISCLOSURE OF THE INVENTION

Problem that the Invention is to Solve

The present invention has been created in view of the above-mentioned present situation of the prior art. An object of the present invention is to provide a hollow fiber type semipermeable membrane which achieves both water permeability and selectivity in high level and which can perform efficient treatment using small membrane area and small installation space in such a water treatment wherein liquids in different concentrations are made to contact via the semipermeable membrane, water is permeated into the semipermeable membrane utilizing the concentration difference between them and the permeated water is taken out therefrom. Another object of the present invention is to provide a method for manufacturing the same, a module and a water treatment method. The hollow fiber type semipermeable membrane of the present invention is particularly suitable for a forward osmosis treatment wherein freshwater is taken out from feed water (such as seawater) by means of permeation through a semipermeable membrane utilizing the concentration difference between the feed water and aqueous solution having higher salt concentration than that as a driving force.

Means for Solving the Problem

The present inventors have earnestly investigated for achieving the object as such and, as a result, they have found that, when a dense layer playing a role of separating function between salt and water in a hollow fiber type semipermeable membrane is made thinner than the conventional one and asymmetrical degree of the dense layer is also enhanced, water permeability and salt rejection ability can be achieved in high level even in the case of forward osmosis treatment utilizing the concentration difference as a driving force whereupon the present invention has been accomplished.

Thus, the present invention has the following constitutions (1) to (4).

(1) A hollow fiber type semipermeable membrane comprising cellulose acetate for forward osmosis treatment, characterized in that, when an aqueous solution of 25° C. having sodium chloride concentration of 35,000 mg/L and pressure of 0 MPa is flown into an outer side of the hollow fiber type semipermeable membrane having length of about 70 cm while freshwater of 25° C. having sodium chloride concentration of 0 g/L is flown into an inner side of the hollow fiber type semipermeable membrane and discharged at 0 MPa, the permeation flow rate is 60 to 180 L/m$^2$/day, the outer diameter of the hollow fiber type semipermeable membrane is 100 to 350 μm, the inner diameter thereof is 50 to 250 μm and the hollow ratio thereof is 24 to 51%, wherein said permeation flow rate is measured under such a condition that twice of the permeated water flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the inner side of the hollow fiber type semipermeable membrane is equal to 10% of said permeated water flow rate.

(2) A method for manufacturing the hollow fiber type semipermeable membrane mentioned in (1), comprising the steps of: preparing a dope containing cellulose acetate, solvent and nonsolvent; extruding the dope from a nozzle to a coagulating liquid via an air gap to manufacture a hollow fiber type semipermeable membrane; washing this hollow fiber type semipermeable membrane with water; and then subjecting this hollow fiber type semipermeable membrane to an annealing treatment by hot water and further to a post-treatment with salt, characterized in that the concentration of cellulose acetate in the dope is 40 to 45% by weight, that the ratio by weight of solvent/nonsolvent in the dope is from 80/20 to 95/5, that the temperature for the annealing treatment by hot water is 65 to 80° C., and that the salt concentration for the post-treatment with salt is 0.5 to 20% by weight.

(3) A hollow fiber type semipermeable membrane module, characterized in that, the hollow fiber type semipermeable membrane mentioned in (1) is incorporated therein.

(4) A water treatment method comprising the steps of: contacting an aqueous solution having high solute concentration with an aqueous solution having low solute concentration via the hollow fiber type semipermeable membrane mentioned in (1); and taking out freshwater from the aqueous solution having low solute concentration, utilizing concentration difference.

Advantages of the Invention

The hollow fiber type semipermeable membrane of the present invention is designed in such a manner that water permeability of the membrane is high and that permeation flow rate is high utilizing the concentration difference in the salt as a driving force due to a high selectivity between water and salt whereby it is possible to efficiently take out freshwater utilizing the concentration difference as a driving force.

BRIEF DESCRIPTION OF THE DRAWINGS

FIG. 1 is an explanatory drawing of the steps for the manufacture of the semipermeable membrane of the present invention.

BEST MODE FOR CARRYING OUT THE INVENTION

Up to now, development of hollow fiber type semipermeable membrane comprising cellulose acetate (particularly semipermeable membrane having high selectivity between salt and water) has been conducted in such a direction that the main purpose is to make the membrane structure dense and that, basically, cellulose acetate concentration in the dope is made high and the membrane after its preparation is subjected to an annealing treatment by hot water of high temperature so that the membrane structure is made further dense. Such a means is rational in view of imparting the durability in the case of the use under a pressurized state and in view of high selectivity, and is appropriate as an aim for the development of semipermeable membrane for a purpose of desalination wherein seawater is fed in high pressure and filtered with a semipermeable membrane. However, when the means is used for a semipermeable membrane for the water treatment wherein the concentration difference between liquids via semipermeable membrane is utilized as a driving force, only such a product having a small permeation flow rate is produced due to the treatment under a low effective pressure difference (difference in osmotic pressure).

In order to achieve both high selectivity between salt and water and high water permeability, the present inventors have conducted an improvement in the membrane structure by taking a new conception for membrane design which sloughs off the conventional way for the development of semipermeable membrane. Thus, we thought that the balance between selectivity for water and salt, and the water permeability can be enhanced when asymmetry of the structure is more enhanced than such a semipermeable membrane wherein the treatment is conducted by feed water at medium to high pressure and, at the same time, the separation active layer (dense layer) is made thin and dense. We also thought that, when the structure is made in such a one wherein diffusion at the support layer is promoted, the concentration polarization on the support layer is reduced and the effective concentration difference is ensured. Further, with regard to the design of a membrane module which achieves the maximum performance while sufficient durability is still maintained, the present inventors paid their attention to optimization of outer diameter and hollow ratio of the hollow fiber type semipermeable membrane based on the relation between the fluid pressure loss of a fluid running the bore and the membrane area per volume of module. The present invention has been achieved after repetition of trials and errors for actualization of the technical idea as such.

The hollow fiber type semipermeable membrane of the present invention adopts cellulose acetate as a raw material. Cellulose acetate is resistant to chlorine which is a bactericide and is characterized in that it can easily suppress the growth of microbes. Accordingly, it has a feature that the pollution with microbes on the membrane can be effectively suppressed. Among the cellulose acetate, cellulose triacetate is preferred in view of durability. In the hollow fiber type membrane, membrane area per each module can be made more as compared with the spiral wound type membrane and, in the case of a module nearly in the same size, a membrane area of about ten-fold of that of the spiral wound type can be achieved, though it may vary depending on size of the hollow fiber type semipermeable membrane. Accordingly, in the hollow fiber type semipermeable membrane, a treating amount per unit membrane area may be small for obtaining the same permeation flow rate whereby stain on the membrane (which causes from permeation of feed water through the membrane) can be reduced and running time until washing of the membrane can be made long.

The hollow fiber type semipermeable membrane of the present invention is useful for a forward osmosis treatment wherein freshwater is permeated from the low concentration area to high concentration area utilizing the concentration difference via a membrane as a driving force so as to take out freshwater from the feed water. Although there is no particular limitation for a recovering method for further taking out the freshwater permeated to the high concentration area, examples thereof include a membrane filtration method, an evaporation method, an electrodialysis method and magnetic force. When the solute in the aqueous solution of high concentration is apt to be separated by the membrane, a membrane filtration treatment at low pressure and under high recovery rate operation is exemplified. When boiling point of the solute in the aqueous solution of high concentration is low such as the case of carbon dioxide and ammonia, it is possible to recover the freshwater using small energy by conducting evaporation at lower temperature than boiling point of water to remain water. Further, when the solute in the solution of high concentration is magnetic fine particles, there is exemplified a method for removing the magnetic fine particles utilizing the magnetic force. When freshwater is taken out as such, seawater may be sometimes used as the feed water. On the other hand, in the case of dehydration of waste water or concentration of aqueous solution containing valuables, it is possible that they will become the feed water and that seawater is used as an aqueous solution of high concentration. Further, when seawater is used as the feed water, freshwater which is removed from waste water is mixed with seawater whereupon salt concentration of seawater can be reduced whereby energy for taking out the freshwater from seawater is reduced and concentration of the waste water can be efficiently carried out at the same time.

Semipermeable membrane is classified according to the operation pressure. Usually, the membrane for high pressure used by an operation pressure of 5 to 8 MPa has a very dense structure since it is used for desalination of seawater and is to be resistant to the pressure which is higher the osmotic pressure of seawater. Therefore, when the effective pressure difference is decreased, permeation flow rate lowers in proportion to the pressure. When the structure of the membrane as a whole is made coarse in order to increase the permeation flow rate, selectivity lowers. Further, in the conventional membrane for lower pressure, it does not have a structure capable of achieving a high permeation flow rate presumably due to the fact that it has been developed on the basis of membranes for medium to high pressure. In the semipermeable membrane of the present invention, it is possible to achieve water permeability and selectivity due to concentration difference of liquid contacting via a membrane in high level. The semipermeable membrane of the present invention is based on a design idea which has not been proposed before.

The hollow fiber type semipermeable membrane of the present invention is characterized in that, when an aqueous solution of 25° C. having sodium chloride concentration of 35,000 mg/L and pressure of 0 MPa is flown into an outer side of the hollow fiber type semipermeable membrane having length of about cm while freshwater of 25° C. having sodium chloride concentration of 0 g/L is introduced from a bore of one opening end of the hollow fiber type semipermeable membrane and discharged at 0 MPa, the permeation flow rate is 60 to 180 L/m²/day, wherein said permeation flow rate is measured under such a condition that twice of the permeated water flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the other opening end of the hollow fiber type semipermeable membrane is equal to 10% of said permeated water flow rate. The reason why the sodium chloride concentration is made 35,000 mg/L is that seawater which is abundantly present in nature is the representative example of aqueous solution of high concentration. In addition, since the permeated water flow rate utilizing the concentration difference as a driving force is affected by the concentration on membrane surface and the concentration polarization, the condition stipulating the value of the permeated water flow rate is set, by taking the practice into consideration, to such a condition that twice of the flow rate of permeated water is equal to a flow rate flown out to the outside area of the hollow fiber type semipermeable membrane and that the flow rate discharged from the other opening end of the hollow fiber type semipermeable membrane is equal to 10% of the permeated water flow rate. Further, since the flow rate in the bore and the pressure loss varies dependent upon the length of the hollow fiber type semipermeable membrane, length of the hollow fiber type semipermeable membrane is stipulated as 70 cm. With regard to the permeation flow rate, it is preferred to be high for decreasing the necessary membrane area and for increasing the treating amount. In view of competitiveness to the conventional hollow fiber type and spiral wound type ones, it is preferably 70 L/m²/day or more, more preferably 80 L/m²/day or more, and further preferably 90 L/m²/day or more. Although there will be no problem even when the permeation flow rate is too high, its upper limit is less than 180 L/m²/day in view of a balance among pressure loss, concentration polarization and selectivity to be achieved. When freshwater is taken out utilizing the concentration difference as a driving force, the direction for permeating the freshwater can be from the outside to the inside or from the inside to the outside of the hollow fiber type semipermeable membrane. It is possible to appropriately determine the direction for permeating the freshwater by taking the concentration and the characteristic of solute in the high-concentration solution, the flow rate level, etc. into consideration.

The hollow fiber type semipermeable membrane of the present invention has a dense layer near the outer surface. Thickness of said dense layer is preferred to be 0.1 to 7 μm. The thickness of the dense layer (which is a substantially active layer for the separation) is preferred to be thin since the resistance to water permeation becomes low by that and, more preferably, it is 6 μm or less, and most preferably, it is 5 μm or less. However, when the thickness of the dense layer is too thin, latent deficiency in the membrane structure is apt to be revealed and there may occur problems such as that leakage of univalent ion becomes difficult or that securing the durability of the membrane decreases. Accordingly, thickness of the dense layer is more preferred to be 0.5 μm or more, and is most preferred to be 1 μm or more.

Inner diameter of the hollow fiber type semipermeable membrane of the present invention is 50 to 250 μm, preferably 65 to 230 μm, and more preferably 75 to 200 μm. When the inner diameter is smaller than the above range, the pressure loss of the fluid flowing through the bore usually becomes large whereby pressure required for flowing desired flow rate of freshwater becomes extremely high when length of the hollow fiber type semipermeable membrane is relatively long, which causes loss of energy. On the other hand, when the inner diameter is larger than the above range, trade-off between the hollow ratio and the module membrane area happens whereby it is necessary to sacrifice any of the durability at the used pressure and the membrane area per unit volume.

Outer diameter of the hollow fiber type semipermeable membrane of the present invention is 100 to 350 μm, preferably 115 to 320 μm, and more preferably 120 to 280 μm. When the outer diameter is smaller than the above range, the inner diameter inevitably becomes small whereby the same problem as in the case of the above inner diameter is resulted. On the other hand, when the outer diameter is larger than the above range, it is not possible to increase the membrane area per unit volume in the module whereby deteriorating the compactness which is one of the advantages of the hollow fiber membrane module.

Hollow ratio of the hollow fiber type semipermeable membrane of the present invention is 24 to 51%, preferably 27 to 45%, and further preferably 30 to 42%. When the hollow ratio is smaller than the above range, membrane resistance becomes large and no desired flow rate of permeated water may be achieved. When the hollow ratio is larger than the above range, no sufficient pressure resistance may be secured even in the use at low pressure.

The hollow ratio (%) can be determined by the following formula:

hollow ratio (%)=[(inner diameter)/(outer diameter)]²×100

Length of the hollow fiber type semipermeable membrane of the present invention is preferably 15 to 400 cm, more preferably 20 to 350 cm, and further preferably 25 to 300 cm. This length is the possible range which is generally used in a hollow fiber membrane module. However, if the length is out of the above range, it may be difficult to achieve both water permeability and salt rejection rate at a low running cost.

Now an example of a method for the manufacture of a hollow fiber type semipermeable membrane of the present invention will be illustrated. As shown FIG. 1, the semipermeable membrane of the present invention is manufactured by extruding a dope from a nozzle to a coagulating bath via an air gap to manufacture a hollow fiber type semipermeable membrane; by washing the resulting hollow fiber type semipermeable membrane with water; and by subjecting the hollow fiber type semipermeable membrane to an annealing treatment by hot water to shrink the membrane. In such a method, the method for the manufacture of the hollow fiber type semipermeable membrane of the present invention is characterized in that polymer concentration in the dope is set relatively high and, at the same time, the ratio of solvent/nonsolvent is set high for promoting the asymmetrization of the membrane. When a dope having such a characteristic is extruded from a nozzle of high temperature, much more solvent is evaporated in the air gap whereby coagulation (nucleation) of the polymer takes place. In the next coagulating bath, since the solvent concentration is set low, coagulation finishes quicker than the progress of the phase separation whereby the outer surface structure of the hollow fiber type semipermeable membrane is more thinly densified. On the other hand, since the inner surface side (bore side) is a closed system and evaporation of solvent is limited, nucleation and growth of the polymer (progress of phase separation) proceed from the air gap to the coagulating bath whereby asymmetrization is promoted. The hollow fiber type semipermeable membrane prepared as such is subjected to an annealing treatment by hot water under a specific range of temperature condition whereupon moderate membrane shrinkage is resulted so that the outer surface layer is densified and, at the same time, the membrane structure is fixed with relatively loose support layer.

Further, a post-treatment with salt is carried out in order to obtain a semipermeable membrane for the water treatment utilizing the concentration difference between two liquids via a semipermeable membrane as a driving force. As a result of the post-treatment, it is possible to obtain a dense and stable membrane structure by dehydration of the polymer of the dense layer in the membrane due to osmotic pressure. As a result thereof, it is possible to express more stable membrane property even in the water treatment under high salt concentration and high osmotic pressure.

The dope to be used contains cellulose acetate (membrane material), solvent and nonsolvent and, if necessary, organic acid and/or organic amine are/is added thereto. As to the cellulose acetate, it is preferred to use cellulose triacetate. As to the solvent, it is preferred to use one or more member(s) selected from the group consisting of N,N-dimethylformamide, N,N-dimethylacetamide, N-methyl-2-pyrrolidone and N,N-dimethyl sulfoxide. More preferred one is N-methyl-2-pyrrolidone. As to the nonsolvent, it is preferred to use one or more member(s) selected from the group consisting of ethylene glycol, diethylene glycol, triethylene glycol and polyethylene glycol. More preferred one is ethylene glycol. As to the organic acid, it is preferred to use amino acid, aromatic carboxylic acid, hydroxy acid, alkoxy acid, dibasic acid or hydroxy monoester thereof. More preferred ones are phthalic acid, tartaric acid, ε-amino-n-caproic acid, benzoic acid, 4-methylaminobutyric acid, p-oxybenzoic acid and maleic acid and one or more thereof may be used. As to the organic amine, any of primary, secondary and tertiary hydroxyalkylamines may be used. To be more specific, monoethanolamine, triethanolamine, diisopropanolamine and triisopropanolamine are preferred. Triisopropanolamine is more preferred.

Concentration of cellulose acetate in the dope is preferred to be 40 to 45% by weight. When the cellulose acetate concentration is lower than the above range, the hollow fiber type semipermeable membrane structure becomes too coarse and no sufficient selectivity and membrane strength may be achieved while, when it is higher than the above range, viscosity of the dope becomes high whereby stability in preparing the membrane may not be achieved or water permeability of the resulting membrane may not be enhanced. The ratio by weight of solvent/nonsolvent in the dope is preferred to be from 80/20 to 95/5. When the ratio by weight of solvent/nonsolvent is lower than the above range, the membrane surface structure does not become dense since evaporation of the solvent does not proceed and, although water permeability does not greatly change, selectivity may become low while, when it is higher than the above range, formation of extremely asymmetric membrane proceeds whereby strength of the membrane may not be achieved.

Then the dope prepared as above is dissolved by heating at 90 to 190° C. and the dissolved dope is extruded from an arc-type nozzle, a C type nozzle or a tube-in-orifice type nozzle heated at 150 to 180° C. When a tube-in-orifice type nozzle is used, it is preferred to use air, nitrogen, carbon dioxide, argon, etc. as a bore-forming material. The extruded dope is passed through the air gap (gaseous atmosphere) for 0.02 to 0.4 second and then dipped in an aqueous coagulating bath to coagulate.

As to a composition of solvent and nonsolvent of the coagulating bath, it is preferred to use the same composition as that used for the dope. As to the composition ratio of a coagulating bath, the ratio by weight of solvent:nonsolvent:water is preferred to be 0 to 15:0 to 8:100 to 77. When the rate of water is too low, phase separation of the membrane proceeds and pore size may become too large. Although the rate of water may be 100%, amount of the waste liquid from the coagulating bath in the continuous membrane manufacture become more.

From the hollow fiber type semipermeable membrane pulled out from the coagulating bath, the remaining solvent, nonsolvent, etc. are removed by washing with water. Examples of the method for washing with water include a multistage inclination gutter method for washing with water where water for washing is flown down in a long inclined gutter and a hollow fiber type semipermeable membrane is dipped in said washing water to conduct the washing with water; a Nelson roller method for washing with water where two long rollers (Nelson rollers) crossing in certain angles are used and hollow fiber type semipermeable membranes are wound in fold upon fold on the rollers wherein the Nelson roller surfaces are always made wet with water for washing and the washing with water is conducted by means of contacting said water for washing to the hollow fiber type semipermeable membranes; a net shower washing method with water where hollow fiber type semipermeable membrane is shaken down onto a net followed by washing with shower water; and a washing with water by dipping where hollow fiber type semipermeable membrane is directly dipped into a washing water in a deep vessel followed by washing with water. In the present invention, any one of methods for washing with water can be used for washing with water.

It is preferred that the hollow fiber type semipermeable membrane subjected to a washing treatment with water is dipped into water under a nontensed state and is subjected to an annealing treatment by hot water at 65 to 80° C. for 5 to 60 minutes, more preferably at 68 to 80° C., and further preferably at 72 to 80° C. As a result of subjecting to an annealing treatment by hot water, improvements in fixation and dimensional stability of membrane structure and in thermal stability can be expected. For such a purpose, in the annealing treatment by hot water, the temperature which is higher than a glass transition point and is lower than a melting point is usually adopted. Even in a case of using cellulose acetate, temperature for the annealing treatment by hot water of as high as 90° C. or higher is generally adopted in a wet state. On the contrary, in the present invention, a treating temperature of as relatively low as 65 to 80° C. is adopted whereby the excessive densification of the membrane structure is suppressed. When the temperature for the annealing treatment by hot water is lower than 65° C., separating property of the membrane is not sufficient and salt leaks out to the low concentration area whereby the effective concentration difference via the membrane becomes small and the permeation flow rate due to the concentration difference becomes small. When the temperature for the annealing treatment by hot water is higher than 80° C., densification of the membrane proceeds, lowering in the permeation flow rate is resulted and the permeation flow rate due to the concentration difference becomes low.

When the temperature for the annealing treatment by hot water is higher than the above range, densification of the membrane structure proceeds too much whereby the balance between the salt rejection rate and the water permeability may be lost while, when it is lower than the above range, asymmetry of the membrane structure is not sufficient whereby no desired salt rejection rate may be achieved. Time for the annealing treatment by hot water is usually 5 to 60 minutes. When the treating time is too short, no sufficient annealing effect may be achieved. In addition, the membrane structure may become non-uniform. When the treating time is too long, not only an increase in manufacturing cost but also too much densification of the membrane may happen whereby no desired balance in the properties may be achieved.

It is preferred that the hollow fiber type semipermeable membrane subjected to the annealing treatment by hot water is then dipped, at room temperature (ca. 25° C.) for 5 to 120 minutes, into an aqueous solution prepared by dissolving lithium chloride, sodium chloride, potassium chloride, magnesium chloride, calcium chloride or the like at the concentration of 0.5 to 20% by weight and more preferably 1.0 to 10% by weight. The chlorides as such can be used in high concentrations since they have high osmotic pressure per concentration and high solubility in water as compared with organic substances such as polymers. When the concentration is too high, the gel structure of the membrane may be broken and water permeability may lower. When the concentration is too low, the effect of the post-treatment may be insufficient. When the treating temperature is too high, the membrane structure is in an unstable state and the osmotic pressure is high whereby the gel structure of the membrane may be broken and water permeability may lower. When it is too low, the effect of the post-treatment may be insufficient. About 15 to 35° C. is preferred. When the treating time is too long, densification of the membrane due to dehydration of the dense layer in the membrane proceeds too much whereby the water permeability may lower. When it is too short, diffusion of the inorganic salt into the membrane may be insufficient and the effect of the present invention may not be achieved.

The hollow fiber type semipermeable membrane of the present invention prepared as above is incorporated in a hollow fiber type semipermeable membrane module. Incorporation may be done by the conventionally known method. As disclosed in the post-grant publications of Japanese Patent Nos. 4412486, 4277147, 3591618 and 3008886, an example of the incorporation of the semipermeable membrane is that 45 to 90 hollow fiber type semipermeable membranes are assembled to give a hollow fiber type semipermeable membrane aggregate, a plurality of the resulting hollow fiber type semipermeable membrane aggregates are aligned horizontally and the resulting flat hollow fiber type semipermeable membrane bundle is traversed to a core pipe having many pores to wind around thereon. The winding angle at this time is made 5 to 60° and the winding is done in such a manner that a crossing part is formed on the surface of a specific position of the wound-up body. After that, both ends of this wound-up body are adhered and only one side and/or both sides thereof is/are cut to form a hollow fiber opening(s) whereupon a hollow fiber type separation membrane element is prepared. The resulting hollow fiber type separation membrane element is inserted into a pressure vessel to assemble a hollow fiber type semipermeable membrane module.

The hollow fiber type semipermeable membrane module of the present invention is suitable for a water treatment wherein freshwater is permeated from an aqueous solution of low concentration area to an aqueous solution of high concentration area, utilizing the concentration difference in the liquids having different concentrations via a semipermeable membrane as a driving force. Preferred aqueous solution of high concentration includes seawater which is abundantly present in nature, concentrated seawater and artificially prepared aqueous solution of high concentration. With regard to the concentration of aqueous solution in high concentration, it is better to be higher. With regard to its osmotic pressure, it is 0.5 to 10 MPa, preferably 1 to 7 MPa, and more preferably 2 to 6 MPa although it depends upon the molecular weight of the solute. Freshwater permeated to an aqueous solution of the high concentration area is recovered by another method whereupon it is possible as a result to recover freshwater from the feed water or to dehydrate the feed water by removal of freshwater therefrom. When freshwater is taken out from seawater, the feed water is seawater and, the aqueous solution of high concentration may be an aqueous solution which is in higher concentration and in higher osmotic pressure than seawater. When freshwater is taken out from an aqueous solution being in lower concentration and lower osmotic pressure than seawater for dehydration or concentration, it is possible to use seawater which is abundantly present in nature as the aqueous solution of high concentration. The hollow fiber type semipermeable membrane module of the present invention is designed so as to achieve high water permeating property of the membrane and, high permeation flow rate utilizing the concentration difference in salt as a driving force due to the high selectivity for water and salt. Accordingly, it is now possible to efficiently obtain water and pressure for the generation of energy utilizing the concentration difference as a driving force.

Incidentally, in the present invention, a solution of high concentration stands for an aqueous solution of 0.7 to 14%, more preferably 1.5 to 10%, and further preferably 3 to 8% in terms of evaporation residue concentration (TDS) in the case of a solution having high salt concentration such as seawater. Similarly, a solution of low concentration is intended for an aqueous solution of not more than 0.2%, more preferably not more than 0.1%, and further preferably not more than 0.05% in terms of evaporation residue concentration.

EXAMPLES

As hereunder, the present invention will be more specifically illustrated by way of Examples although the present invention is not limited to those Examples only. Measurements of the characteristic values measured in the Examples were conducted according to the following methods.

(1) Inner Diameter, Outer Diameter, and Hollow Ratio

Inner diameter, outer diameter and membrane thickness of the hollow fiber type semipermeable membrane were obtained in such a manner that appropriate numbers of hollow fiber type semipermeable membrane are inserted into the pores of 3 mm diameter opened in the center of a slide glass to such an extent that the hollow fiber type semipermeable membranes do not fall therethrough, the hollow fiber type semipermeable membranes are cut using a razor along the upper and lower sides of the slide glass to prepare samples of the hollow fiber type semipermeable membrane sections, and short and long diameters of the resulting sections of hollow fiber type semipermeable membrane are measured using a projector Nikon PROFILE PROJECTOR V-12. For each hollow fiber type semipermeable membrane section, short and long diameters in two directions were measured and an arithmetic mean value of each of them was adopted as inner or outer diameter of one hollow fiber type semipermeable membrane section while the membrane thickness was calculated as [(outer diameter)−(inner diameter)]/2. Similar measurement was conducted for five sections and mean values thereof were adopted as inner diameter, outer diameters and membrane thickness.

Hollow ratio was calculated by the formula [(inner diameter)/(outer diameter)]$^2$×100.

(2) Permeation flow rate due to pressure difference After the hollow fiber type semipermeable membranes were bundled and inserted into a sleeve made of plastic, thermosetting resin was injected into the sleeve and hardened to seal. Terminal of the hollow fiber type semipermeable membrane hardened by the thermosetting resin was cut to give an opening of the hollow fiber type semipermeable membrane whereupon there was prepared a module for the evaluation having the membrane area based on the outer diameter of about 0.1 m$^2$. This module for the evaluation was connected to a device for testing the membrane properties comprising a tank for feed water and a pump whereby the properties were evaluated.

A feed aqueous solution having sodium chloride concentration of 1,500 mg/L was filtered from outside to inside of the hollow fiber type semipermeable membrane at 25° C. and 1.5 MPa pressure and the device was operated for 1 hour. After that, water permeated through the membrane was collected from the opening of the hollow fiber type semipermeable membrane and weight of permeated water was measured by an electron balance (LIBROR EB-3200D manufactured by Shimadzu). The weight of permeated water was converted to amount of permeated water at 25° C. according to the following formula:

Amount of permeated water (L)=weight of permeated water (kg)/0.99704 (kg/L).

Permeation flow rate (FR) is calculated by the following formula:

FR [L/m$^2$/day]=amount of the permeated water (L)/ membrane area based on the outer diameter [m$^2$]/collecting time [minutes]×(60 [minutes]× 24 [hours]).

(3) Salt Rejection Rate Due to Pressure Difference

Sodium chloride concentration was measured using a conductometric detector (CM-25R by Toa DKK) from the permeated water collected in the above measurement for permeation flow rate and the feed aqueous solution having sodium chloride concentration of 1,500 mg/L used for the same measurement of permeation flow rate.

Salt rejection rate is calculated by the following formula:

salt rejection rate [%]=(1−salt concentration of permeated water [mg/L]/salt concentration of feed aqueous solution [mg/L])×100

(4) Permeation Flow Rate Due to Concentration difference (Preparation of hollow fiber type semipermeable membrane element)

A hollow fiber type semipermeable membrane (bundle) was aligned in a crossing manner around a distribution tube for the feed fluid consisting of porous tube whereupon an aggregate of the hollow fiber type semipermeable membrane was formed. Specifically, the hollow fiber type semipermeable membrane bundle was traversed together with rotating the distribution tube for the feed fluid around its axis so that the bundle was wound around the distribution tube for the feed fluid whereupon the hollow fiber type semipermeable membrane was aligned in a crossing manner. The hollow fiber type semipermeable membrane in the outermost layer was about 41° to the axial direction. Both ends of this aggregate of the hollow fiber type semipermeable membrane were fixed by potting with an epoxy resin and, after that, both ends were cut to open the bore of the hollow fiber type semipermeable membrane whereupon a hollow fiber type semipermeable membrane element was prepared. Outer diameter of the hollow fiber type semipermeable membrane aggregate in the hollow fiber type semipermeable membrane element was 117 mm and length in axial direction of the gap between the open ends was 580 mm. Average effective length of the hollow fiber type semipermeable membrane was about 70 cm. Effective membrane area based on the outer diameter of the hollow fiber type semipermeable membrane was 67 m$^2$.

(Measurement of Permeated Water Flow Rate of Module)

The resulting module was installed in the pressure container and freshwater having sodium chloride concentration of 0 g/L was fed, using a feed pump, from a port in the ports connecting to each opening of the hollow fiber type semipermeable membrane and the freshwater was flown out from another port. An aqueous solution having sodium chloride concentration of as high as 35,000 mg/L was fed to a distribution tube for the feed fluid connected to the outside of the hollow fiber type semipermeable membrane using a feed pump, passed the outside of the hollow fiber type semipermeable membrane and then flown out from a port existing in the side area of a pressure container being connected to the outside of the hollow fiber type semipermeable membrane aggregate and the flow rate was adjusted by a flow rate adjusting valve. Flow rate and pressure of each feed pump were adjusted so that permeated water flow rate (QDS2−QDS1), pressure and flow rate of module became the following conditions when discharging pressure of the aqueous solution in high concentration was PDS2 (MPa), feed flow rate was QDS1 (L/min), discharging water flow rate of the aqueous solution in high concentration was QDS2 (L/min), feed flow rate of freshwater was QFS1 (L/min), flowing-out flow rate of freshwater was QFS2 (L/min) and flowing-out pressure of freshwater was PFS2 (MPa) and then the flow rate increase (QDS2−QDS1) of the aqueous solution in high concentration was measured as the permeating water flow rate of module.

$PDS2 \leq 10$ kPa $PFS2 = 0$ MPa $QDS1/(QDS2-QDS1) = 2$ $QFS2/(QDS2-QDS1) = 0.1$ Permeation flow rate due to concentration difference (FR) is calculated by the following formula:

FR [L/m$^2$/day]=permeated water flow rate of module (L/min)/membrane area based on the outer diameter [m$^2$]×(60 [minutes]×24 [hours])

(5) Thickness of the Dense Layer

After the hollow fiber type semipermeable membrane to be evaluated was washed with water, it was dipped for 1 hour in 2-propanol (Nacalai Tesque) of 25° C. and then dipped for 1 hour in cyclohexane (Nacalai Tesque) of 25° C. to conduct a solvent substitution. Liquid was removed from the hollow fiber type semipermeable membrane after the solvent substitution followed by drying for 24 hours in a vacuum drier (Yamato Vacuum Drying Oven DP41) with inner temperature of 50° C. and inner pressure of −40 Pa.

The resulting dried hollow fiber type semipermeable membrane was embedded in resin and a slice was cut out therefrom using a microtome (REICHERT-NISSEI ULTRA-CUT) so that the hollow fiber type semipermeable membrane section can be observed.

The cut-out slice was observed under a differential interference microscope (Nikon Optiphot stand, reflective differential interference apparatus NR).

From the resulting microscopic image, thicknesses of dense layers in ten places were measured and a mean value thereof was adopted as the thickness of the dense layer.

Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 75° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 100 µm, outer diameter of 175 µm and hollow ratio of 33%.

Module of 1,000 mm length for the evaluation was prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 2

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 68° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 100 µm, outer diameter of 175 µm and hollow ratio of 33%.

Module of 1,000 mm length for the evaluation was prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 3

Cellulose triacetate (CTA, Daicel, LT35) (41% by weight), 47.0% by weight of N-methyl-2-pyrrolidone (NMP, Mitsubishi Chemical), 11.7% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 80° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 100 µm, outer diameter of 175 µm and hollow ratio of 33%.

Module of 1,000 mm length for the evaluation was prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 4

Cellulose triacetate (CTA, Daicel, LT35) (41% by weight), 52.8% by weight of N-methyl-2-pyrrolidone (NMP, Mitsubishi Chemical), 5.9% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 72° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 100 μm, outer diameter of 175 μm and hollow ratio of 33%.

Module of 1,000 mm length for the evaluation was prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 5

A hollow fiber type semipermeable membrane having inner diameter of 76 μm, outer diameter of 120 μm and hollow ratio of 40% was prepared according to the same manner as in Example 1.

Modules of 1,000 mm length for the evaluation were prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 6

Cellulose triacetate (CTA, Daicel, LT35) (43% by weight), 51.0% by weight of N-methyl-2-pyrrolidone (NMP, Mitsubishi Chemical), 5.7% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 65° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 158 μm, outer diameter of 250 μm and hollow ratio of 40%.

Module of 1,000 mm length for the evaluation was prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 7

A hollow fiber type semipermeable membrane having inner diameter of 248 μm, outer diameter of 350 μm and hollow ratio of 50% was prepared according to the same manner as in Example 1.

Modules of 1,000 mm length for the evaluation were prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 8

A hollow fiber type semipermeable membrane was prepared according to the same manner as in Example 1, except that concentration of sodium chloride in the post-treatment was changed to 1% by weight.

Modules of 1,000 mm length for the evaluation were prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Example 9

A hollow fiber type semipermeable membrane was prepared according to the same manner as in Example 1, except that concentration of sodium chloride in the post-treatment was changed to 7% by weight.

Modules of 1,000 mm length for the evaluation were prepared using the hollow fiber type semipermeable membrane of this Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 1.

Comparative Example 1

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 40° C. and subjected to an annealing treatment for 40 minutes. No post-treatment with salt was conducted.

The resulting hollow fiber type semipermeable membrane had inner diameter of 100 μm, outer diameter of 175 μm and hollow ratio of 33%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 2

Cellulose triacetate (CTA, Daicel, LT35) (38% by weight), 52.4% by weight of N-methyl-2-pyrrolidone (NMP, Mitsubishi Chemical), 9.3% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 60° C. and subjected to an annealing treatment for 40 minutes. No post-treatment with salt was conducted.

The resulting hollow fiber type semipermeable membrane had inner diameter of 100 µm, outer diameter of 175 µm and hollow ratio of 33%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 3

Cellulose triacetate (CTA, Daicel, LT35) (41% by weight), 41.1% by weight of N-methyl-2-pyrrolidone (NMP, Mitsubishi Chemical), 17.6% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 60° C. and subjected to an annealing treatment for 40 minutes. No post-treatment with salt was conducted.

The resulting hollow fiber type semipermeable membrane had inner diameter of 100 µm, outer diameter of 175 µm and hollow ratio of 33%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 4

Cellulose triacetate (CTA, Daicel, LT35) (47% by weight), 44.8% by weight of N-methyl-2-pyrrolidone (NMP, Mitsubishi Chemical), 7.9% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 98° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 100 µm, outer diameter of 175 µm and hollow ratio of 33%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 5

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 60° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 90 µm, outer diameter of 175 µm and hollow ratio of 26%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber.

Permeation flow rate was measured using the element. Results of the evaluation are summarized in Table 2.

Comparative Example 6

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 65° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 80 μm, outer diameter of 175 μm and hollow ratio of 21%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 7

Cellulose triacetate (CTA, Daicel, LT35) (41% by weight), 49.9% by weight of N-methyl-2-pyrrolidone (NMP, Mitsubishi Chemical), 8.8% by weight of ethylene glycol (EG, Mitsubishi Chemical) and 0.3% by weight of benzoic acid (Nacalai Tesque) were uniformly dissolved at 180° C. to give a dope. The resulting dope was defoamed in vacuo, extruded from an arc-type nozzle (divided into three) at 163° C. into the space which is isolated from the outer air and, after space time of 0.3 second, dipped into a coagulating bath of 12° C. comprising NMP/EG/water in 4.25/0.75/95. After that, the hollow fiber type semipermeable membrane was washed by a multistage inclination gutter method and shaken off when the membrane was still in a wet state. The resulting hollow fiber type semipermeable membrane was dipped in water of 65° C. and subjected to an annealing treatment for 40 minutes. Then, a post-treatment with salt was conducted with sodium chloride solution of 35,000 mg/L, at about 25° C., for 5 minutes.

The resulting hollow fiber type semipermeable membrane had inner diameter of 200 μm, outer diameter of 270 μm and hollow ratio of 55%.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

Comparative Example 8

A hollow fiber type semipermeable membrane was prepared according to the same manner as in Example 1, except that concentration of sodium chloride in the post-treatment was changed to 0.2% by weight.

Modules of 1,000 mm length for the evaluation were prepared using the hollow fiber type semipermeable membrane of this Comparative Example. Permeation flow rate and salt rejection rate due to pressure difference were measured using the module. Also, element for measuring the permeation flow rate due to concentration difference was prepared with 700 mm effective length of the hollow fiber. Permeation flow rate was measured using the element. Results of the evaluation are summarized in Table 2.

TABLE 1

| | | Example 1 | Example 2 | Example 3 | Example 4 | Example 5 | Example 6 | Example 7 | Example 8 | Example 9 |
|---|---|---|---|---|---|---|---|---|---|---|
| Dope | polymer concentration (% by weight) | 41 | 41 | 41 | 41 | 41 | 43 | 43 | 41 | 41 |
| | solvent (% by weight) | 49.9 | 49.9 | 47 | 52.8 | 49.9 | 51.0 | 51.0 | 49.9 | 49.9 |
| | non-solvent (% by weight) | 8.8 | 8.8 | 11.7 | 5.9 | 8.8 | 5.7 | 5.7 | 8.8 | 8.8 |
| | organic acid (% by weight) | 0.3 | 0.3 | 0.3 | 0.3 | 0.3 | 0.3 | 0.3 | 0.3 | 0.3 |
| | solvent/non-solvent (ratio by weight) | 85/15 | 85/15 | 80/20 | 90/10 | 85/15 | 90/10 | 90/10 | 85/15 | 85/15 |
| Annealing treatment temperature by hot water (° C.) | | 75 | 68 | 80 | 72 | 75 | 72 | 72 | 75 | 75 |
| Post-treatment with salt | | Present (3.5%) | Present (3.5%) | Present (3.5%) | Present (3.5%) | Present (3.5%) | Present (3.5%) | Present (3.5%) | Present (1%) | Present (7%) |
| Dimension | inner diameter (μm) | 100 | 100 | 100 | 100 | 76 | 170 | 248 | 100 | 100 |
| | outer diameter (μm) | 175 | 175 | 175 | 175 | 120 | 270 | 350 | 175 | 175 |
| | hollow ratio (%) | 33 | 33 | 33 | 33 | 40 | 40 | 50 | 33 | 33 |
| | length (mm) | 1000 | 1000 | 1000 | 1000 | 1000 | 1000 | 1000 | 1000 | 1000 |
| | thickness of dense layer (μm) | 2 | 2 | 4 | 1 | 2 | 2 | 2 | 2 | 2 |
| Performance due to pressure difference | permeation flow rate (L/m$^2$/day) | 150 | 200 | 130 | 160 | 120 | 200 | 210 | 155 | 145 |
| | salt rejection rate (%) | 99.5 | 98 | 99.5 | 99.5 | 99.5 | 99.7 | 99.8 | 99.4 | 99.6 |

TABLE 1-continued

|  |  | Example 1 | Example 2 | Example 3 | Example 4 | Example 5 | Example 6 | Example 7 | Example 8 | Example 9 |
|---|---|---|---|---|---|---|---|---|---|---|
| Performance due to concentration difference | permeation flow rate (L/m²/day) | 104.5 | 66.0 | 91.9 | 110.0 | 77.0 | 162.5 | 169.8 | 102 | 100 |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|---|
| Dope | polymer concentration (% by weight) | 41 | 38 | 41 | 47 | 41 | 41 | 41 | 41 |
|  | solvent (% by weight) | 49.9 | 52.4 | 41.1 | 44.8 | 49.9 | 49.9 | 49.9 | 49.9 |
|  | non-solvent (% by weight) | 8.8 | 9.3 | 17.6 | 7.9 | 8.8 | 8.8 | 8.8 | 8.8 |
|  | organic acid (% by weight) | 0.3 | 0.3 | 0.3 | 0.3 | 0.3 | 0.3 | 0.3 | 0.3 |
|  | solvent/non-solvent (ratio by weight) | 85/15 | 85/15 | 70/30 | 85/15 | 85/15 | 85/15 | 85/15 | 85/15 |
| Annealing treatment temperature by hot water (° C.) |  | 40 | 60 | 60 | 98 | 60 | 65 | 65 | 75 |
| Post-treatment with salt |  | Absent | Absent | Absent | Present (3.5%) | Present (3.5%) | Present (3.5%) | Present (3.5%) | Present (0.2%) |
| Dimension | inner diameter (μm) | 100 | 100 | 100 | 100 | 90 | 80 | 200 | 100 |
|  | outer diameter (μm) | 175 | 175 | 175 | 175 | 175 | 175 | 270 | 175 |
|  | hollow ratio (%) | 33 | 33 | 33 | 33 | 26 | 21 | 55 | 33 |
|  | length (mm) | 1000 | 1000 | 1000 | 1000 | 1000 | 1000 | 1000 | 1000 |
| thickness of dense layer (μm) |  | 2 | 2 | 8 | 2 | 2 | 2 | 2 | 2 |
| Performance due to pressure difference | permeation flow rate (L/m²/day) | 330 | 240 | 200 | 50 | 250 | 130 | 200 | 160 |
|  | salt rejection rate (%) | 80 | 84 | 85 | 99.9 | 96 | 97 | 97 | 99.3 |
| Performance due to concentration difference | permeation flow rate (L/m²/day) | 15.2 | 14.2 | 12.9 | 38.9 | 57 | 39 | 58 | 53 |

As will be apparent from Tables 1 and 2, since all of the hollow fiber type semipermeable membranes of Examples 1 to 9 have high water permeability utilizing concentration difference as a driving force, it is now possible to efficiently take out the freshwater from an aqueous solution of low concentration utilizing the concentration difference as a driving force in a small installing space. On the contrary, in Comparative Example 1, temperature for annealing treatment by hot water is low whereby densification and fixation of the membrane structure are insufficient and, although the water permeability by pressurization is high, salt rejection rate is low whereby, in the water treatment utilizing the concentration difference as a driving force, salt is leaked out and the concentration difference via the hollow fiber type semipermeable membrane is not sufficiently achieved whereupon the water permeability utilizing the concentration difference as a driving force is low. In Comparative Example 2, since polymer concentration is low and temperature for annealing treatment by hot water is low, densification of the structure as a whole membrane is insufficient and, although water permeability by pressurization is high, in the water treatment utilizing the concentration difference as a driving force, salt is leaked out and the concentration difference via the hollow fiber type semipermeable membrane is not sufficiently achieved whereupon the water permeability utilizing the concentration difference as a driving force is low. In Comparative Example 3, the ratio of solvent/non-solvent is large and it is likely that the solvent evaporation in the running part in the air is not promoted sufficiently, so the structure of the membrane surface is not densified as expected and selectivity is not high and, as a result, in the water treatment utilizing the concentration difference as a driving force, salt is leaked out and the concentration difference via the hollow fiber type semipermeable membrane is not sufficiently achieved whereupon the water permeability utilizing the concentration difference as a driving force is low. In Comparative Example 4, probably because the polymer concentration in the dope is high and the temperature for annealing treatment by hot water is high, water permeability by pressurization is low and, in the case of water treatment utilizing the concentration difference as a driving force, water permeability is low as well. In Comparative Example 5, since the temperature for annealing treatment by hot water is not sufficient, densification and fixation of the membrane structure are insufficient and, although water permeability by pressurization is high, salt rejection ability is not sufficient and, in the water treatment utilizing the concentration difference as a driving force, salt is leaked out and the concentration difference via the hollow fiber type semipermeable membrane is not sufficiently achieved whereupon the water permeability utilizing the concentration difference as a driving force is low. In Comparative Example 6, since inner diameter of the hollow fiber is small and hollow ratio is small, water permeability and salt rejection rate due to pressure difference are not high as a result of affection by the fluidity pressure loss in the inner area of the bore whereby permeation flow rate due to concentration difference is low as well. In Comparative Example 7, although the hollow ratio is big, permeation flow rate due to pressure difference is low. That is probably due to the fact that, since the resistance to pressure upon measuring the property is low, maintenance of the membrane structure is difficult whereby the permeation flow rate also becomes low. Further, the reason why the permeation flow rate due to concentration difference is also low is presumably due to the fact that, since the hollow ratio is too big, flow rate in the inner surface of the bore of the hollow fiber type semipermeable membrane becomes relatively small compared with the flow rate in the inner area of the bore whereby the affection by the concentration polarization becomes big. In Comparative Example 8, since the salt concentration upon post-treatment with salt is too low, osmotic pressure is low and the effect acting on the membrane is small whereby, although the water permeability due to pressure difference measured under the low salt concentration is high, it is likely that the water permeability due to concentration difference when contacting the high salt concentration becomes low.

INDUSTRIAL APPLICABILITY

The hollow fiber type semipermeable membrane of the present invention is designed so as to achieve high water permeating property of the membrane and, high permeation flow rate utilizing the concentration difference in salt as a driving force due to high selectivity for water and salt. Accordingly, it is very useful in such a field wherein freshwater is taken out utilizing the concentration difference as a driving force.

The invention claimed is:

1. A hollow fiber type semipermeable membrane comprising cellulose acetate for forward osmosis treatment, characterized in that, when an aqueous solution of 25° C. having sodium chloride concentration of 35,000 mg/L and pressure of 0 MPa is flown into an outer side of the hollow fiber type semipermeable membrane having length of about 70 cm while freshwater of 25° C. having sodium chloride concentration of 0 g/L is flown into an inner side of the hollow fiber type semipermeable membrane and discharged at 0 MPa, the permeation flow rate is 60 to 180 L/m²/day, the outer diameter of the hollow fiber type semipermeable membrane is 100 to 350 μm, the inner diameter thereof is 50 to 250 μm and the hollow ratio thereof is 24 to 51%, wherein a dense layer having a thickness of 0.1 to 7 μm is near the outer surface of the hollow fiber type semipermeable membrane, wherein said permeation flow rate is measured under such a condition that twice of the permeated water flow rate flown from the inner side to the outer side of the hollow fiber type semipermeable membrane utilizing the concentration difference as a driving force is equal to a flow rate flown into the outer side of the hollow fiber type semipermeable membrane and that the discharged flow rate from the inner side of the hollow fiber type semipermeable membrane is equal to 10% of said permeated water flow rate, and wherein the hollow fiber type semipermeable membrane exhibits a salt rejection rate of 98% or more.

2. A method for manufacturing the hollow fiber type semipermeable membrane mentioned in claim 1, comprising the steps of: preparing a dope containing cellulose acetate, solvent and nonsolvent; extruding the dope from a nozzle to a coagulating liquid via an air gap to manufacture a hollow fiber type semipermeable membrane; washing this hollow fiber type semipermeable membrane with water; and then subjecting this hollow fiber type semipermeable membrane to an annealing treatment by hot water and further to a post-treatment with salt, characterized in that the concentration of cellulose acetate in the dope is 40 to 45% by weight, that the ratio by weight of solvent/nonsolvent in the dope is from 80/20 to 95/5, that the temperature for the annealing treatment by hot water is 65 to 80° C., and that the salt concentration for the post-treatment with salt is 0.5 to 20% by weight.

3. A hollow fiber type semipermeable membrane module, characterized in that, the hollow fiber type semipermeable membrane mentioned in claim 1 is incorporated therein.

4. A water treatment method comprising the steps of: contacting an aqueous solution having high solute concentration with an aqueous solution having low solute concentration via the hollow fiber type semipermeable membrane mentioned in claim 1; and taking out freshwater from the aqueous solution having low solute concentration, utilizing the concentration difference.

* * * * *